United States Patent [19]
Yui et al.

[11] Patent Number: 5,444,804
[45] Date of Patent: Aug. 22, 1995

[54] OPTICAL WAVEGUIDE MODULE

[75] Inventors: Dai Yui; Shinji Ishikawa; Hiroshi Suganuma; Shigeru Semura, all of Yokohama, Japan

[73] Assignee: Sumitomo Electric Industries, Ltd., Osaka, Japan

[21] Appl. No.: 282,452

[22] Filed: Jul. 29, 1994

[30] Foreign Application Priority Data

Jul. 29, 1993 [JP] Japan .................................. 5-188348
Jul. 6, 1994 [JP] Japan .................................. 6-154916

[51] Int. Cl.$^6$ .............................................. E02B 6/255
[52] U.S. Cl. ........................................ 385/49; 385/51; 385/95; 385/98; 385/99
[58] Field of Search ................... 385/49, 14, 51, 95, 385/97, 98, 99

[56] References Cited

U.S. PATENT DOCUMENTS

| | | | |
|---|---|---|---|
| H595 | 7/1987 | LaFaw ................................. | 385/95 |
| 4,227,951 | 10/1980 | Mignien ............................... | 385/99 |
| 4,714,316 | 12/1987 | Moore et al. ........................ | 385/99 |
| 4,729,625 | 8/1988 | Loscoe et al. ...................... | 385/99 |
| 4,744,619 | 5/1988 | Cameron .............................. | 385/49 |
| 4,746,189 | 5/1988 | Arrington et al. ................. | 385/99 |
| 4,753,509 | 6/1988 | Parstorfer ............................ | 385/99 |
| 4,772,086 | 9/1988 | Bellerby et al. .................... | 385/49 |
| 4,778,242 | 10/1988 | Ota et al. ............................. | 385/99 |
| 4,818,055 | 4/1989 | Patterson ............................. | 385/99 |
| 4,930,854 | 6/1990 | Albares et al. ..................... | 385/49 |
| 4,953,936 | 9/1990 | Regener et al. .................... | 385/49 |
| 5,024,505 | 6/1991 | Junji et al. .......................... | 385/97 |
| 5,091,986 | 2/1992 | Arii et al. ............................ | 385/48 |
| 5,175,781 | 12/1992 | Hockaday et al. ................. | 385/49 |
| 5,231,683 | 7/1993 | Hockaday et al. ................. | 385/49 |
| 5,297,228 | 3/1994 | Yanagawa et al. ................. | 385/129 |

FOREIGN PATENT DOCUMENTS

| | | | |
|---|---|---|---|
| 324492 | 7/1989 | European Pat. Off. ........ | G02B 6/30 |
| 331332 | 9/1989 | European Pat. Off. ........ | G02B 6/30 |
| 422445 | 4/1991 | European Pat. Off. ........ | G02B 6/38 |
| 428951 | 5/1991 | European Pat. Off. ........ | G02B 6/28 |
| 5-27139 | 2/1993 | Japan ............................... | G02B 6/30 |
| 5-45531 | 2/1993 | Japan ............................... | G02B 6/30 |

OTHER PUBLICATIONS

Patent Abstracts of Japan, vol. 9, No. 329, Dec. 24, 1985, G02B 6/28B, JP60-156,021.
Patent Abstracts of Japan, vol. 11, No. 274, Mar. 4, 1987, G02B 6/30, JP62-73,210.

*Primary Examiner*—Frank Gonzalez
*Attorney, Agent, or Firm*—Cushman Darby & Cushman

[57] ABSTRACT

It is an object of the present invention to provide an optical waveguide module in which, under the high temperature and high humidity, degradation of characteristics does not occur and which has strength to the oscillation, simple structure, and high reliability. A module unit 30 is formed by bonding a connector 32 provided at one end of a single-optical fiber cable 22 and a connector 31 provided at one end of a ribbon optical fiber cable 21 at both ends of a waveguide substrate 35 having a 1×4 branch optical waveguide by an adhesive having light transmission properties. The module unit 30 is provided in a housing 10, and at least a connecting portion between the optical waveguide and the optical fiber cable is covered with the resin contained in the housing 10. The housing 10 is sealed with a cover unit 15, and the single-optical fiber cable 22 and the ribbon optical fiber cable 21 are tightly inserted into a respective hole at end walls of the housing 10 and led out to the outside.

6 Claims, 14 Drawing Sheets

OPTICAL WAVEGUIDE MODULE

BACKGROUND OF THE INVENTION

1. Field of the Invention

The present invention relates to an optical waveguide module which is used in an optical fiber communication network and others.

2. Related Background Art

An optical waveguide module comprising, e.g., an optical branching filter and others, generally comprises a module unit which is formed by bonding end faces of optical fiber cables with a respective end face of an optical waveguide and which is housed in a housing. In the optical waveguide module, under the high temperature and high humidity, an adhesive which is used in the connecting portion between the optical waveguide and the optical fibers moistens and is degraded, which causes the degradation of characteristics: increase of loss and light reflection, degrade of tensile strength.

Therefore, the housing is sealed with, e.g., a nitrogen gas ($N_2$). Alternatively, the housing is filled with a jelly-like resin. As such conventional techniques, for example, a technique disclosed in "Japanese Patent Laid-Open No. HEI 5-27139 (27139/1993)" is known. As a technique of coating the outside of the housing with a resin, for example, a technique disclosed in "Japanese Patent Laid-Open No. HEI 5-45531 (45531/1993)" is known.

SUMMARY OF THE INVENTION

It is an object of the present invention to provide an optical waveguide module with high weather resistance and the long-term high reliability.

It is one object of the present invention to provide an optical waveguide module comprising a module unit having a waveguide device with a waveguide substrate on which an optical waveguide is formed, and a fiber connector for holding a optical fiber cable, the waveguide device being bonded to the fiber connector; a housing for housing the module unit, the housing having a hole through which the optical fiber is inserted into inside of the housing and is led out to outside of the housing, and the housing a depth larger than a thickness of the module unit; a member made of a resin covering a bonding portion between said waveguide device and the fiber connector, the member being filled in the housing, the material being introduced in liquid-state into the inside of the housing to immerse said bonding portion and thereafter being cured in the inside of the housing; and a cover unit having a substantially flat shape for sealing said housing.

In this specification and claims, a waveguide-device means a device including a wave-guide substrate itself, a device in which various optical elements are added into the wave-guide substrate, or a device in which a waveguide forming surface of the waveguide substrate is covered with a resin etc.

According to the present invention, since the housing has a depth deeper than a thickness of the module unit, a connecting portion between the waveguide device and the fiber connector can be immersed in a liquid resin composition by filling the liquid resin composition into the housing, and as the resin is cured, the connecting portion can be covered with the resin member. Therefore, the module unit can be housed in a container constituted with the housing and the cover unit, and the module unit is contained in the resin member, so that the characteristics are hardly degraded caused by the moisture.

Further, a protective cover is provided at the housing so as to project to the outside, which prevents the stress to be applied to the optical fibers, and if the protective cover is constituted with an upper member and a lower member, works of assembling the module unit and housing the module unit in the housing can be made easier.

Furthermore, since the cover is made flat, the waveguide module can be made very thin, and if a protrusion is formed on the inner rim of the housing, this protrusion serves as a sluice for the liquid resin composition. The housing is bonded with the cover unit at the outer rim by the adhesive.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
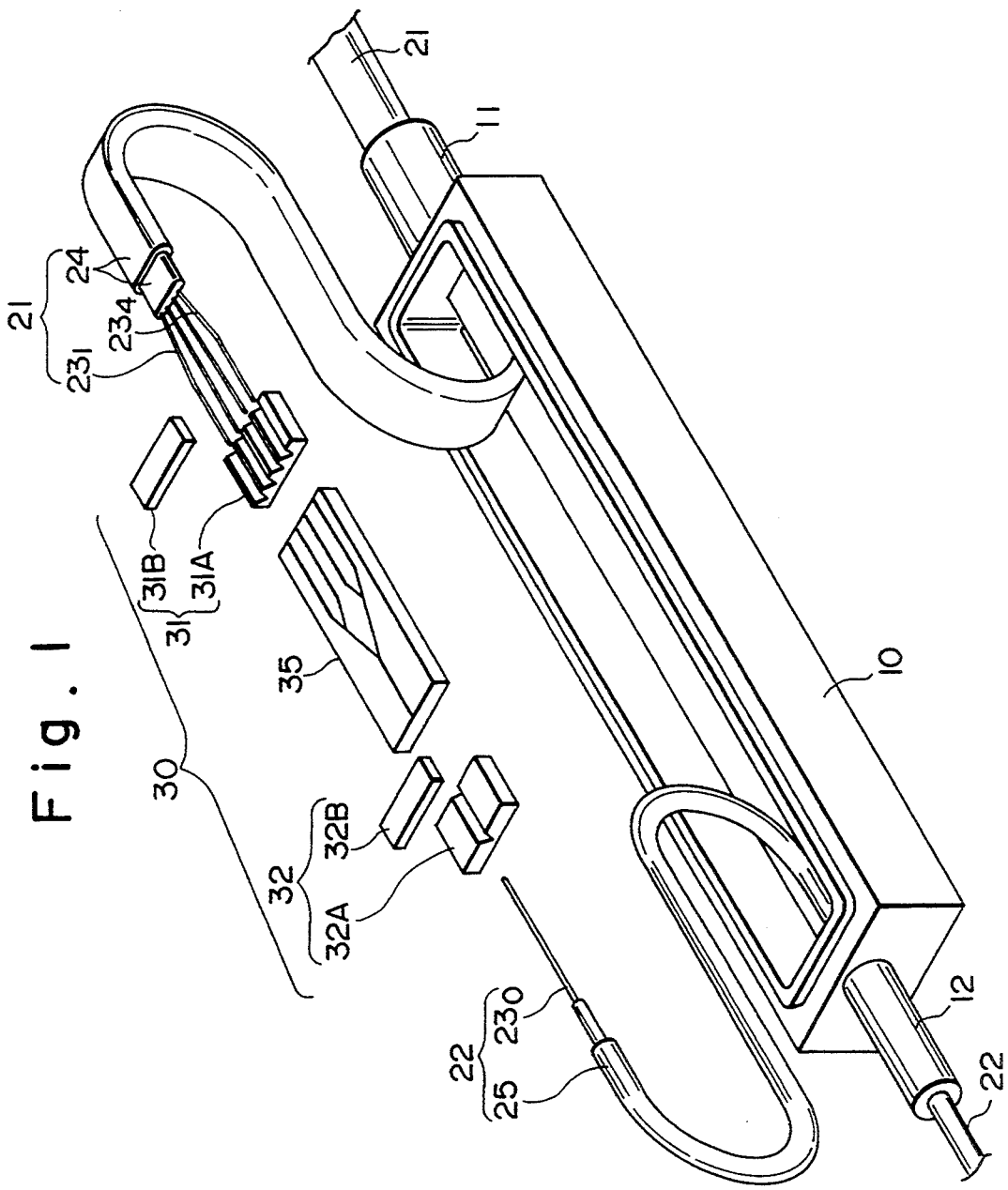
FIG. 1 is a perspective view showing a state of an optical waveguide module before a module unit is assembled in a manufacturing process of an optical waveguide module according to the first embodiment.

The embodiments will be described below. The same components are represented by the same reference numerals and the repetitive description on the same devices is omitted.

FIGS. 1–5 show a process of assembling an optical waveguide module according to the first embodiment. Its structure will be apparent from the explanation of this process. As shown in FIG. 1, a housing 10 has a long box shape, and a large-diameter protective cover 11 having a through hole to which a ribbon optical fiber cable 21 can be inserted is formed at the housing 10 so as to protrude from one end of the housing 10, and a small-diameter protective cover 12 having a through hole to which a single-optical fiber cable 22 can be inserted is formed so as to protrude from the other end. The ribbon optical fiber cable 21 is formed by coating four bare fibers $23_1$–$23_4$ made of silica glass individually with a resin layer (not shown), arranging these fibers in a plane, and integrating the fibers with internal and external resin layers (integral coating layer 24). The integral coating layer 24 touches the inner surface of the hole of the large-diameter protective cover 11. The single-optical fiber cable 22 is formed by coating one bare fiber $23_0$ with external and internal resin single-optical fiber coating layers 25. The single-optical fiber coating layers 25 touches the inner surface of the hole of the small-diameter protective cover 12.

Figure 2:
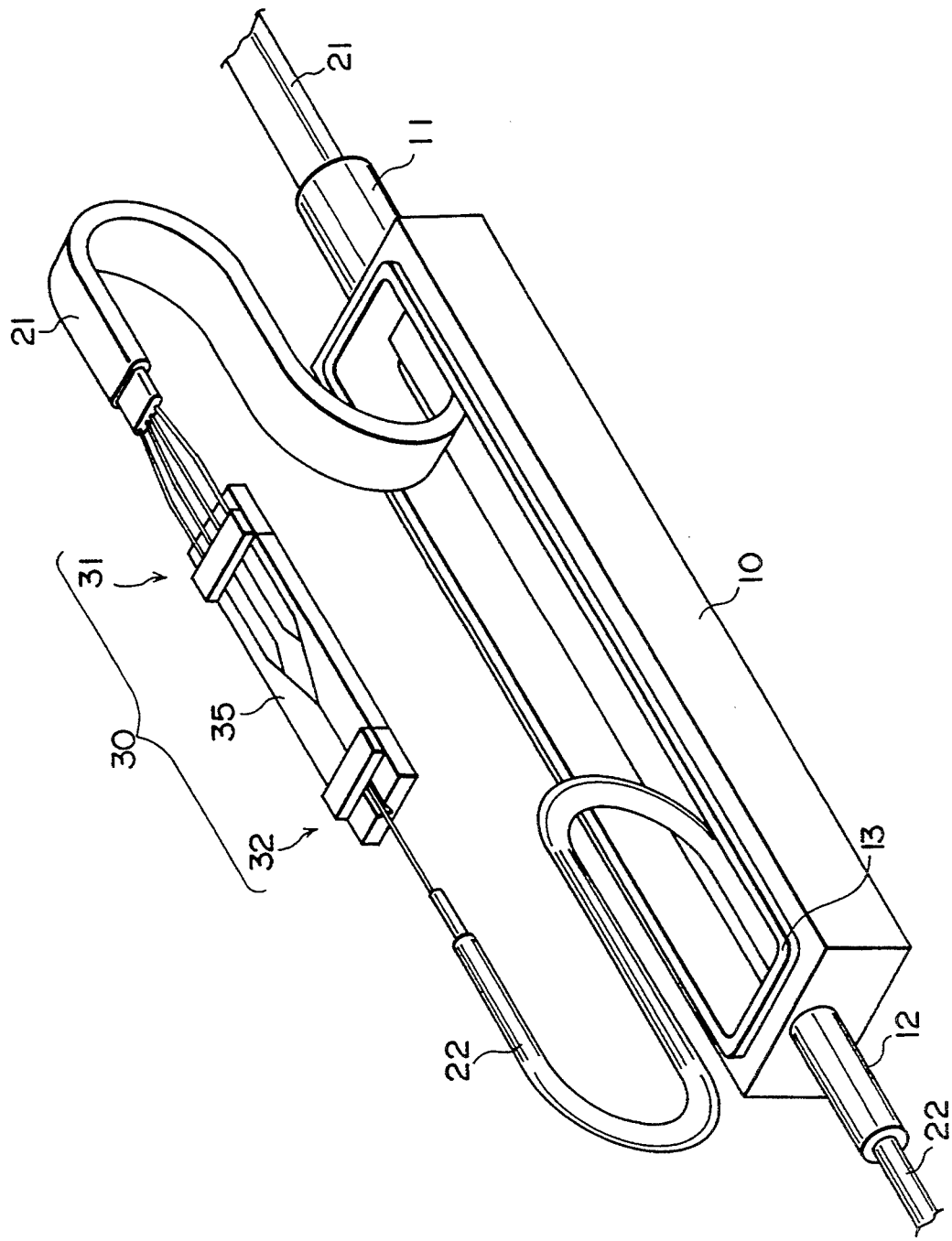
FIG. 2 is a perspective view showing a state of an optical waveguide module after a module unit is assembled in a manufacturing process of an optical waveguide module according to the first embodiment.

The module unit 30 is fabricated by connecting fiber connectors 31, 32 at both ends of a waveguide substrate 35. With the ribbon optical fiber cable 21 and the single-optical fiber cable 22 are inserted into the large-diameter protective cover 11 and the small-diameter protective cover 12, respectively, the module unit 30 is assembled as shown in FIGS. 1–2. First, the bare fibers $23_1$–$23_4$ and the bare fiber $23_0$ are exposed from the ends of the ribbon optical fiber cable 21 and the single-optical fiber cable 22, and set in V-shaped grooves of a multi-fiber V-shaped groove substrate 31A and a single-fiber V-shaped groove substrate 32A, respectively. Next, presser plates 31B and 32B are put on the substrates and adhered thereto to form a multi-fiber connector 31 which holds the bare fibers $23_1$–$23_4$ and a single-fiber connector 32 which holds the bare fiber $23_0$. Note that the V-shaped groove substrates 31A and 32A are fabricated by mechanically grinding a silicon substrate or by physically and chemically etching a silicon substrate.

FIG. 2 shows a state of an assembled module unit 30, and a waveguide substrate 35 lies between these connectors 31, 32. A 1×4 branch type optical waveguide is formed on a surface of the waveguide substrate 35. Such an optical waveguide substrate 35 is fabricated by depositing a plane lower cladding layer, a 1×4-branch-lines-shaped core layer and a plane upper cladding layer, and vitrifying these layers, using a method of depositing $SiO_2$ fine particles on a surface of a silicon substrate (FHD: flame hydrolysis deposition method). Next, both end faces of the waveguide substrate 35 are fixed with the end faces of the multi-fiber connector 31 and the single-fiber connector 32 by a photocuring adhesive (e.g., ultra violet ray curing adhesive). A protrusion 13 is provided on the inner rim of the housing 10 so that the inner rim is high and the outer rim is low.

With a state shown in FIG. 2, as the ribbon optical fiber cable 21 and the single-optical fiber cable 22 are pulled toward both sides, the module unit 30 is housed in the housing 10. Here, the depth of the housing 10 is sufficiently large as compared with the thickness of the module unit 30 to entirely store the module unit 30 in the housing 10. The housing 10 is fixed at the central part of the base of the module unit 30 by the adhesive, and the integral coating layer of the ribbon optical fiber cable 21 and the single-fiber coating layer 25 are fixed to the large-diameter protective cover 11 and the small-diameter protective cover 12 by the adhesive, respectively. As apparent from FIG. 2, the optical fiber cables 21 and 22 and the waveguide substrate 35 are arranged substantially on one line. Accordingly, the optical fiber cables 21 and 22 are practically not bent. Therefore, this structure is such that excessive stress is not applied to the connecting portion between the optical fiber cables 21 and 22 and the waveguide substrate 35.

Figure 3:
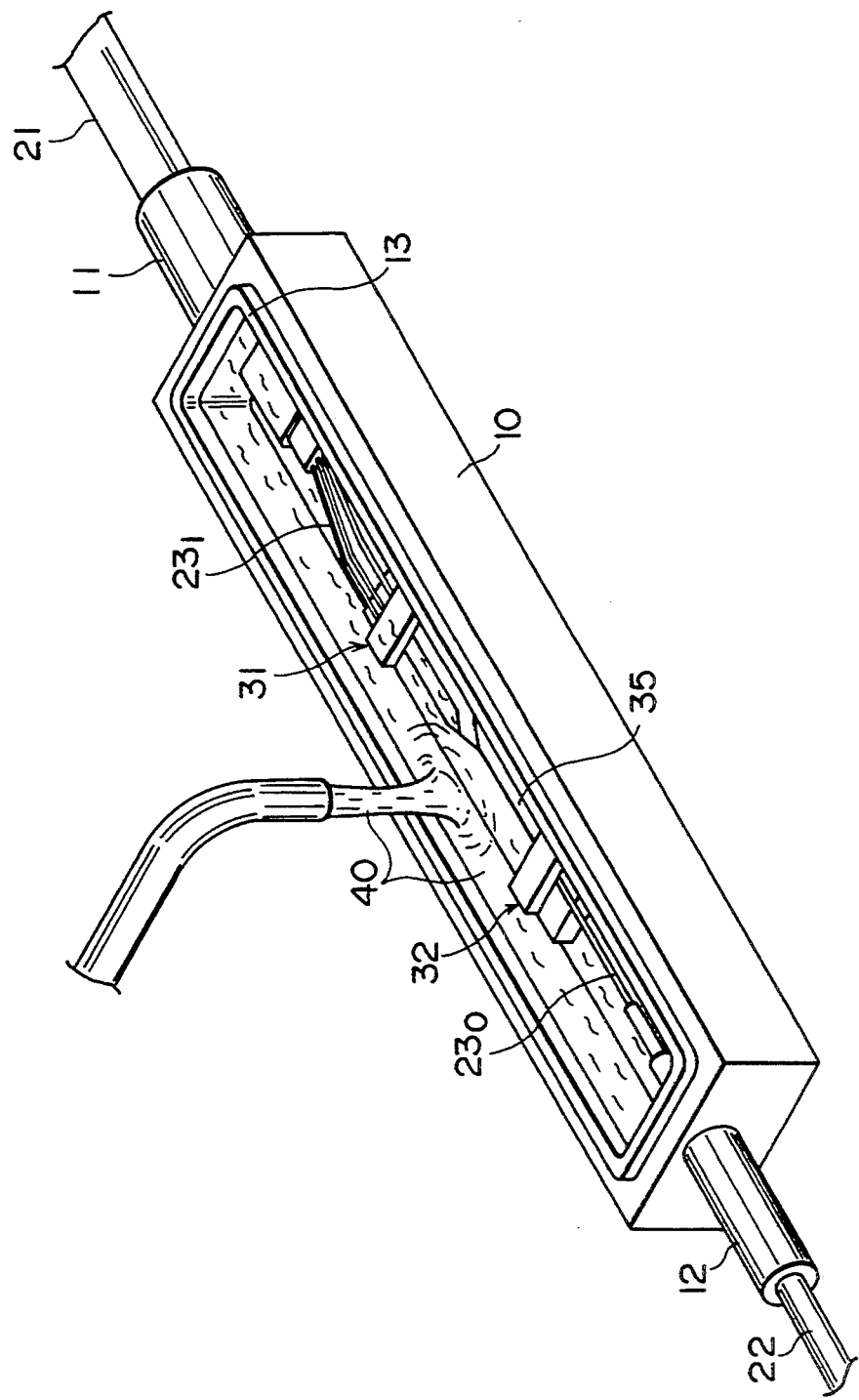
FIG. 3 is a perspective view showing a state of liquid resin injection in a manufacturing process of an optical waveguide module according to the first embodiment.

Next, as shown in FIG. 3, a liquid resin 40 containing a jelly-like resin composition is injected and filled into the housing 10. Here, since the housing 10 has a depth larger than the thickness of the module unit 30, the entire module unit 30 is immersed in the liquid resin 40. Further, since the protrusion 13 is formed along the inner rim of the housing 10, the liquid resin 40 hardly overflows.

Figure 4:
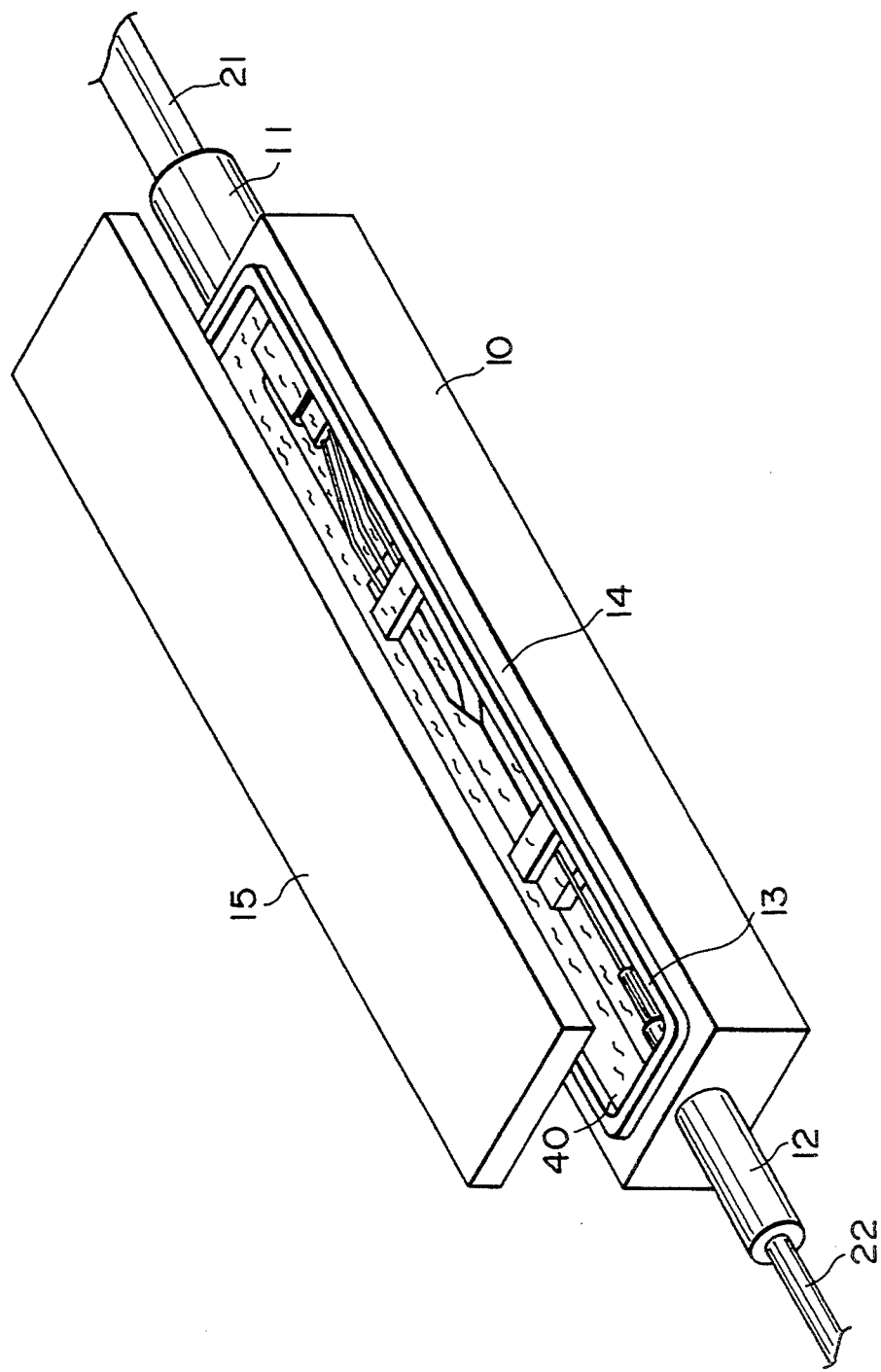
FIG. 4 is a perspective view showing a state of an optical waveguide module before a housing is sealed in a manufacturing process of an optical waveguide module according to the first embodiment.
Figure 5:
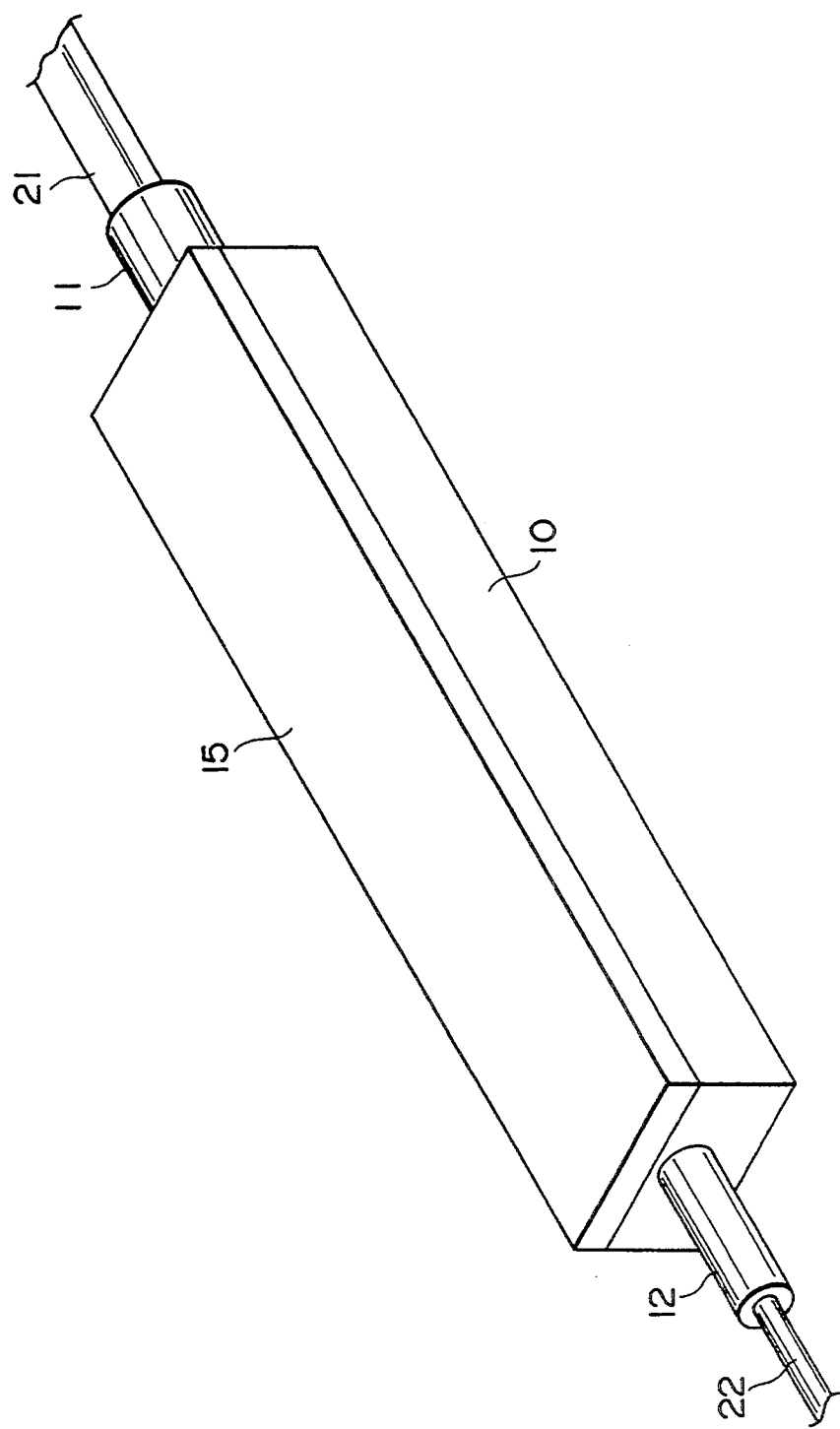
FIG. 5 is a perspective view showing an appearance of a completed optical waveguide module according to the first embodiment.

Next, the housing 10 is sealed with a cover unit 15. A state before sealing is shown in FIG. 4, and a state after sealing is shown in FIG. 5. Here, the cover unit 15 has a groove (not shown) along the perimeter of the lower surface corresponding to the protrusion 13 formed along the inner rim of the housing 10. The adhesive is applied to the outer rim 14 of the housing 10, and the cover unit 15 is adhered thereto. As described above, the optical waveguide module according to the present embodiment is completed.

In the above embodiment, the housing 10 and the cover unit 15 can be made of ceramic, plastic or metal, e.g., Al (aluminum). Various kinds of adhesives such as an adhesive which cures upon light irradiation (photocuring adhesive) such as a UV ray, an adhesive which cures upon application of heat (thermosetting adhesive), or an adhesive which cures upon mixture of two liquids: a main agent and a curing agent, can be utilized for an adhesive between the large-diameter protective cover 11 and the integral coating layer 24, an adhesive between the small-diameter protective cover 12 and the single-fiber coating layer 25, an adhesive for the formation of the multi-fiber connector 31 and the single-fiber connector 31, and an adhesive between the housing 10 and the cover unit 15. For example, epoxy adhesive EPO-TEC 302-3 (manufactured by RIKEI CO., LTD) and epoxy adhesive STAYCAST 2057 (manufactured by GRACE JAPAN CO., LTD) are used for an adhesive between the housing 10 and the cover unit 15, and the EPO-TEC is used for the formation of the multi-fiber connector 31 and the single-fiber connector 32. Epoxy adhesive OPTDAIN UV-2100, 3100 (manufacture by DAIKIN KOUGYOU COMPANY) is used for the connection of the waveguide substrate 35, the multi-fiber connector 31 and the single-fiber connector 32. The OPTDAIN contains a material having light (signal light) transmission properties in which loss hardly occurs, and is suitable for an adhesive between the optical waveguide and the end face of the optical fiber.

On the other hand, as the liquid resin 40 for filling, a resin which, before curing, is liquid with high fluidity and which, after curing, is solid, e.g., gel, having a suitable elasticity is desirable. In particular, the preferred properties are as follows. First, it is superior in fluidity before curing and able to fill a narrow space. Second, it is superior in stickiness and adhesion, and has a sealing property and a moisture resistance. Third, it is comparatively soft after curing and easily transformed by small weight or pressure. Fourth, it has a low elastic module after curing and able to relax the stress due to thermal expansion. Fifth, it has an oscillation absorptivity after curing. SILICONE GEL (manufactured by SHINETU SILICONE COMPANY) is an example of such a liquid resin 40. XNR-4950 (manufactured by NIPPON CHIBA GAIGI COMPANY) which is a super-reflective thermosetting epoxy resin, or PERU-URETHANE MU-102A/B (manufactured by NIPPON PERUNOX CO., LTD) which is a two liquid mixture curing polyurethane resin can be used.

Figure 6:
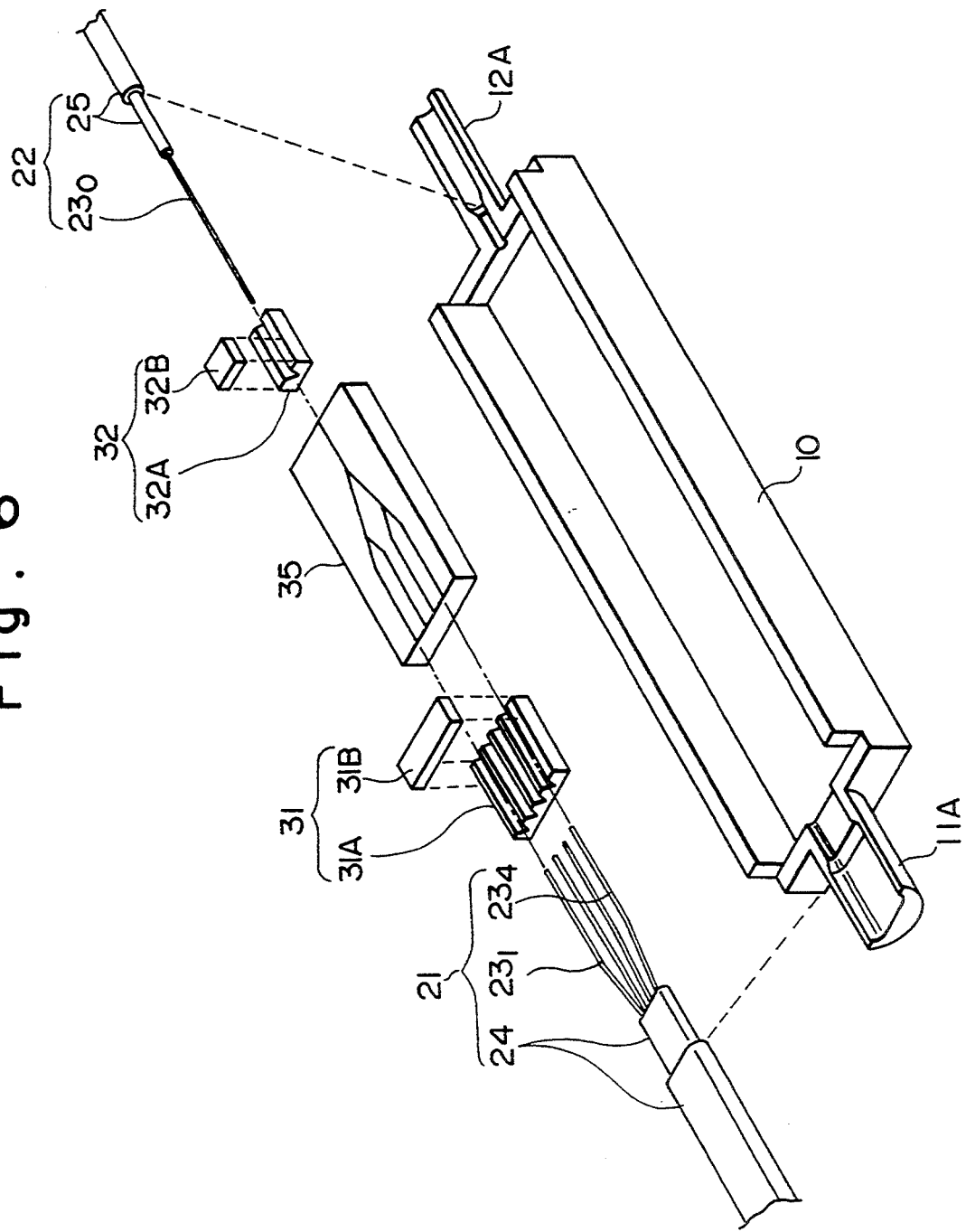
FIG. 6 is a perspective view showing a state of an optical waveguide module before a module unit is assembled in a manufacturing process of an optical waveguide module according to the second embodiment.
Figure 7:
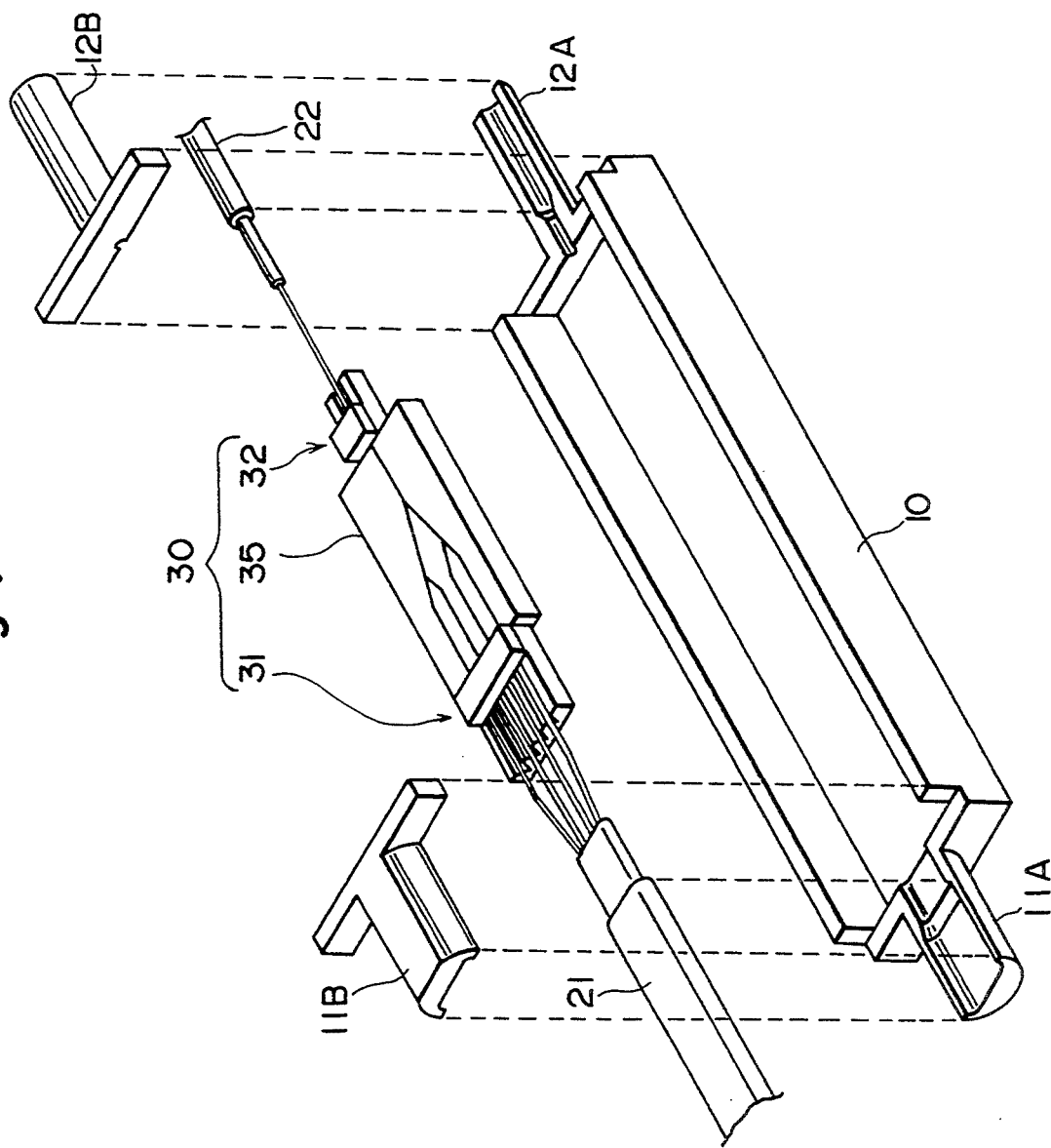
FIG. 7 is a perspective view showing a state of an optical waveguide module after a module unit is assembled in a manufacturing process of an optical waveguide module according to the second embodiment.

Next, referring to FIG. 6–FIG. 9, an optical waveguide module of the second embodiment will be explained. In this embodiment, the module is also a 1×4 branch type optical waveguide module, and the components as same as FIG. 1–FIG. 5 are represented by the same reference numerals. As shown in FIG. 6 and FIG. 7, in this embodiment, the large-diameter protective cover 11 and the small-diameter protective cover 12 at both sides of the housing 10 are constituted with lower half units 11A and 12A and upper half units 11B and 12B, respectively. The lower half units 11A and 12A and the housing 10 are integrally formed. These are easily formed of a polycarbonate resin or a ceramic material. This is because the large-diameter protective cover 11 and the small-diameter protective cover 12 are divided into the upper and lower half units.

Further, since the large-diameter protective cover 11 and the small-diameter protective cover 12 are divided into the upper and lower half units, a module unit 30 is easily assembled. That is, in the first embodiment, as shown in FIG. 1 and FIG. 2, after the ribbon optical fiber cable 21 and the single-optical fiber cable 22 are inserted into the through holes of the large-diameter protective cover 11 and the small-diameter protective cover 12, the formation of the fiber connector 31 and the single-fiber connector 32, and the connection of the multi-fiber connector 31 and the single-fiber connector 32 to the waveguide substrate 35, that is, the assembling of the module unit 30 are performed. According to the present embodiment, before the optical fiber cables 21 and 22 are installed in the housing 10, the module unit 30 can be formed. Then, after the module unit 30 is completed, it is housed in the housing 10 without bending the optical fiber cables, so that the module unit 30 is not damaged by the excessive stress in the manufacturing process.

As shown in FIG. 7, the module unit 30 is formed by connecting a multi-fiber connector 31 for a ribbon optical fiber cable 21 and a single-fiber connector 32 for a single-optical fiber cable 22 at both sides of a waveguide substrate 35. Next, the module unit 30 is housed in the housing 10. The ribbon optical fiber cable 21 is set and adhered in a groove of the lower half unit 11A of the large-diameter protective cover 11, and the single-optical fiber cable 22 is set and adhered in a groove of the lower half unit 12A of the small-diameter protective cover 12. Next, the upper half units 1ib and 12B are bonded with the lower half units 11A and 12A, so that the housing 10 having the large-diameter protective cover 11 and the small-diameter protective cover 12, protruding from the both ends is formed.

Figure 8:
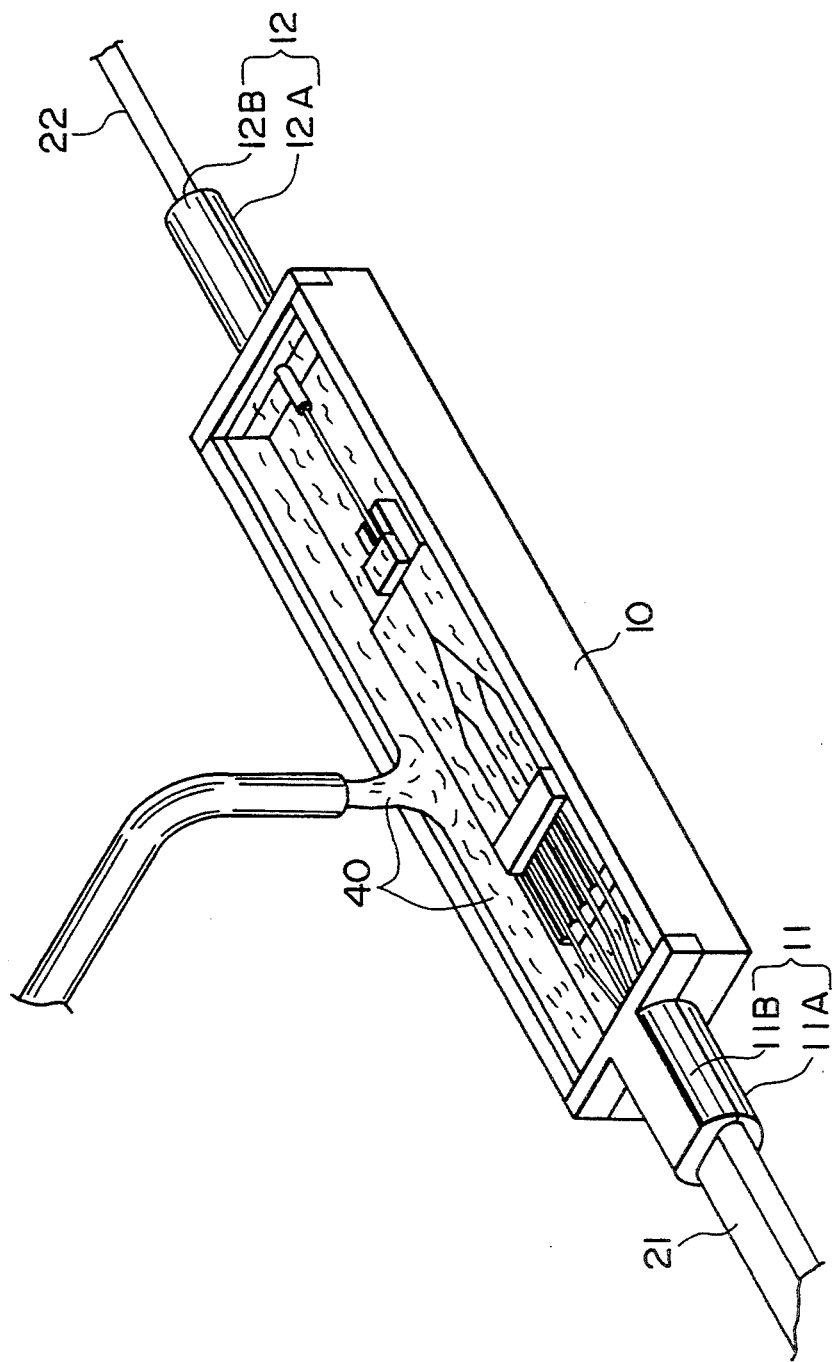
FIG. 8 is a perspective view showing a state of liquid resin injection in a manufacturing process of an optical waveguide module according to the second embodiment.
Figure 9:
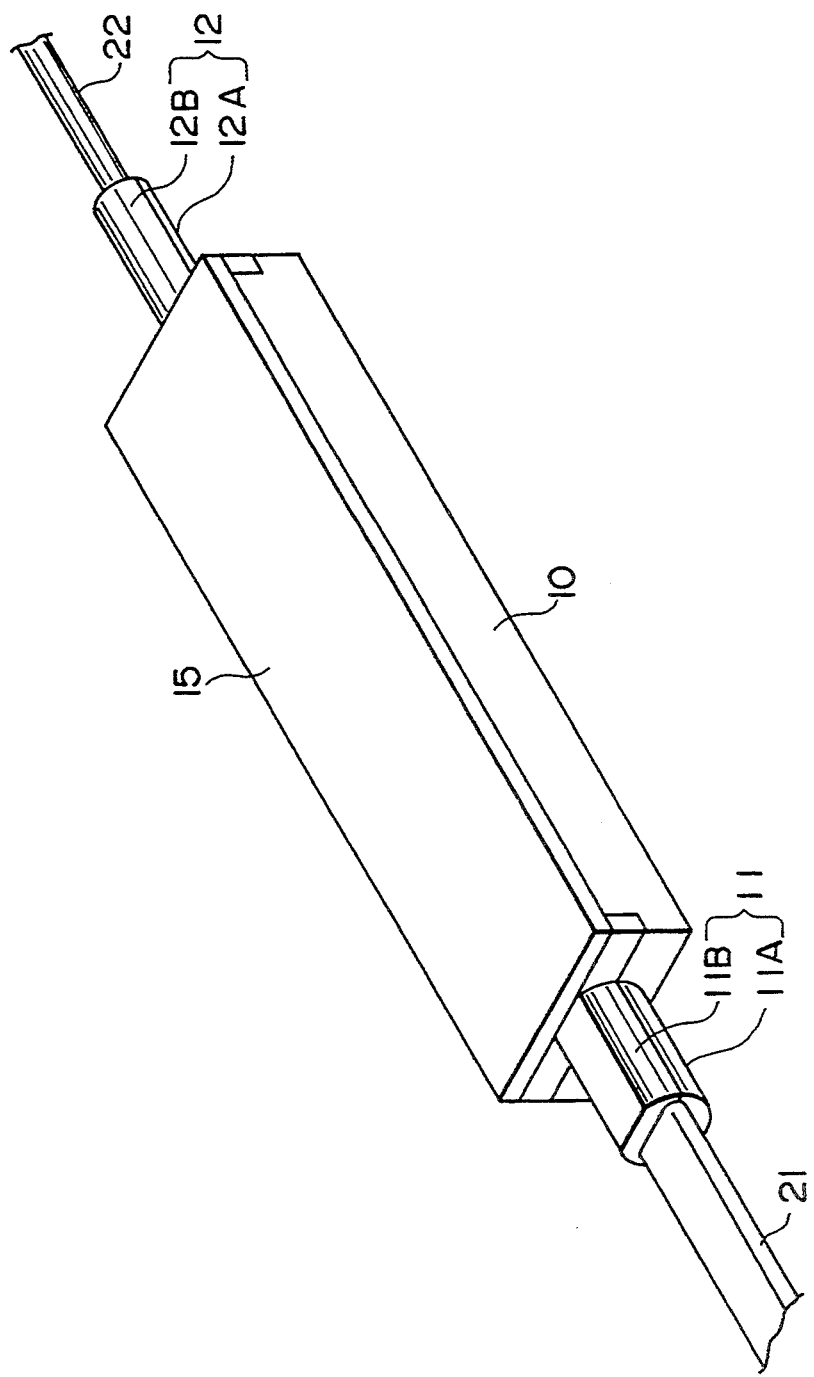
FIG. 9 is a perspective view showing an appearance of a completed optical waveguide module according to the second embodiment.

As shown in FIG. 7, the upper half units 11B and 12B have substantially T shapes with holding parts for the optical fiber cables 21 and 22 as vertical axes, and their horizontal parts are put in cutouts at both ends of the housing 10, whereby the housing 10 has a box shape. Accordingly, as shown in FIG. 8, a liquid resin 40 is injected into the housing 10, and the entire module unit 30 can be immersed in the liquid resin 40. FIG. 9 is a perspective view of a completed optical waveguide module. The same adhesive and liquid resin 40 as the first embodiment can be used in this embodiment. According to the second embodiment, after the module unit 30 is assembled, it is set in the housing 10, so that the process is very simple and any excessive stress is not applied to the optical fiber cables 21 and 22. Further, the formation of the housing 10 is made easier. Ceramics or plastic can be used as a material of the housing 10. Further, the adhesive between the optical fiber cables 21 and 22 and the protective covers 11 and 12 of the housing can be made perfect, so that the improvement of the mechanical strength and the improvement of sealing property can be achieved.

Figure 10:
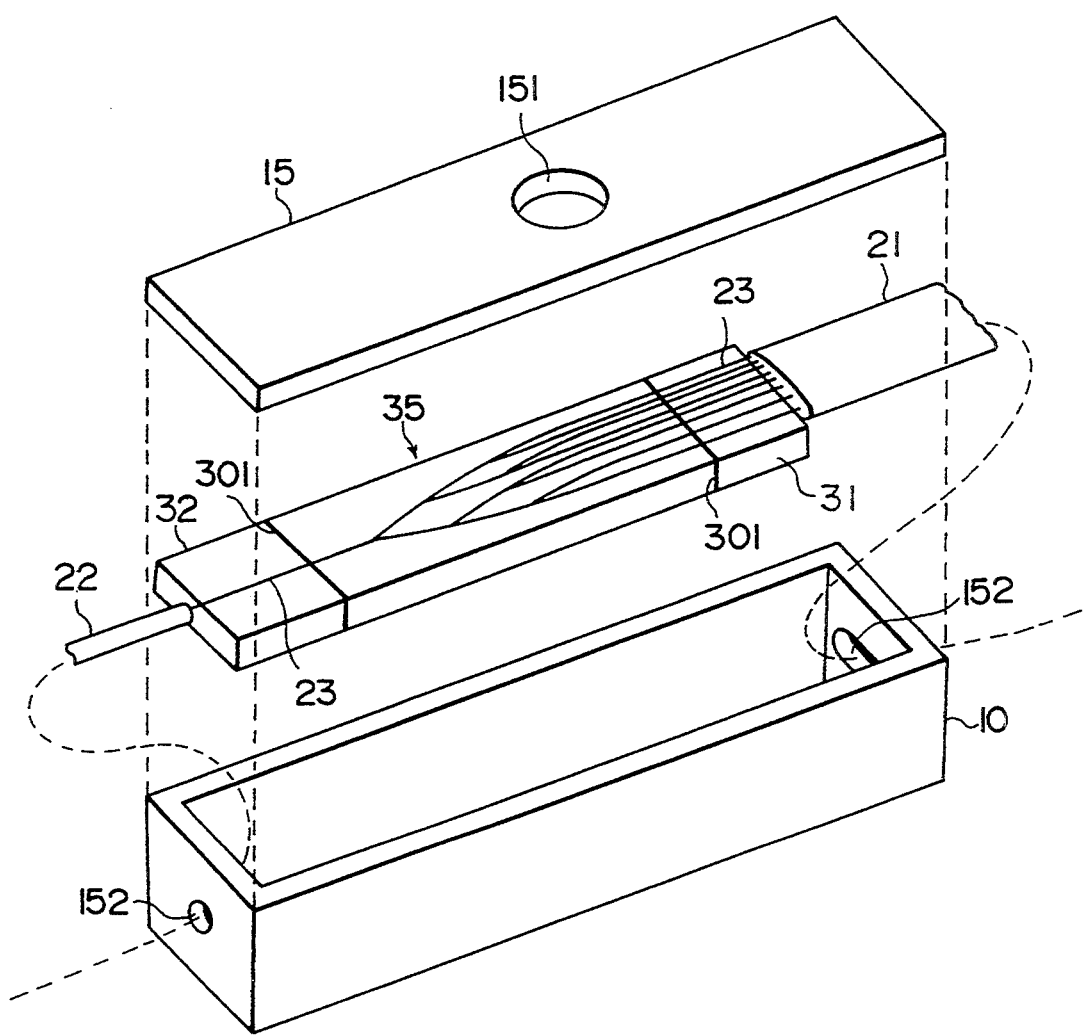
FIG. 10 is an exploded perspective view showing an optical waveguide module according to the third embodiment.
Figure 11:
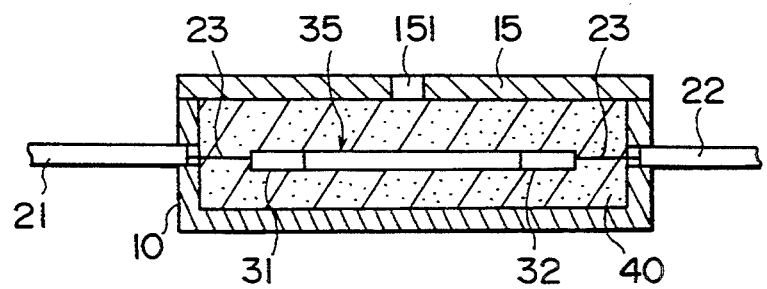
FIG. 11 is a vertical sectional view showing an optical waveguide module according to the third embodiment.

FIG. 10 is a perspective view of an optical waveguide module according to the third embodiment, and FIG. 11 is its vertical sectional view. In this embodiment, a ribbon optical fiber cable 21 and a single-optical fiber cable 22 are inserted into holes 152 at both ends of a housing 10 from the inside, and a module unit 30 is assembled and housed in the housing 10. Next, the housing 10 is sealed with a cover plate 15 having a hole 151 at the central portion.

The above module unit 30 is formed by connecting the optical fiber cables 21 and 22 at both ends of an optical waveguide substrate 35. The optical waveguide substrate 35 is a silica waveguide substrate which is constructed as a 1×8 branch filter on an Si substrate by a flame hydrolysis deposition method. Further, connectors 32 and 31 holding the single-optical fiber cable 22 and the arrayed-multi-optical fiber cable 21 are fixed at both ends of the waveguide substrate 35 by an adhesive 301, respectively.

The signal light incidence side of the optical waveguide is coupled and aligned with the single-optical fiber cable 22 so that its optical axis matches an optical axis of an optical fiber 23 led out from the single-optical fiber cable 22 through the left-hand side single-fiber connector 32. The signal light emerging side, which is branched into plural (eight), of the optical waveguide is coupled and aligned with the waveguide substrate 35 so that their optical axes match optical axes of arrayed eight optical fibers 23 led out from the ribbon optical fiber cable 21 through the right-hand side multi-fiber connector 31.

Each connector 31 and 32 has a V-shaped groove formed on an Si chip, and the optical fibers 23 are inserted in the V-shaped grooves. End faces of the connectors 31 and 32 are fixed at the end faces of the waveguide substrate 35 using the adhesive 301. Further, for the adhesive 301, an ultra violet ray curing adhesive which is transparent against signal light and which has a refractive index matching with refractive indices of the optical waveguide and the optical fibers 23 is used.

The holes 152 are formed at both end walls of the housing 10. When the module unit 30 is provided in the housing 10, the single-optical fiber cable 22 and the ribbon optical fiber cable 21, which are connected to the connectors 31 and 32, respectively are inserted into the respective hole 152 and led out to the outside of the housing 10. Note that a gap between the hole 152 and the single-optical fiber cable 22 and a gap between the hole 152 and the ribbon optical fiber cable 21 are preferably small, and these gaps are filled with the adhesive to fix the single-optical fiber cable 22 and the ribbon optical fiber cable 21 at the housing 10.

As described above, the module unit 30 is provided in the housing 10, and the single-optical fiber cable 22 and the ribbon optical fiber cable 21 are led out to the outside of the housing 10. Thereafter, a jelly-like resin 40, e.g., a silicone gel as an elastic filling material is poured into the housing 10 (see FIG. 11). Next, an opening of the housing 10 is sealed with the cover plate 15 having the hole 151.

In the above case, a larger amount of the jelly-like resin 40 is preferable and the resin 40 may fill up the housing 10 in order to prevent the moisture from moistening the adhesive 301 of the connecting portion between the optical waveguide and the bare optical fibers 23. However, in this case, the resin 40 may be expanded according to heat depending upon the working temperature and its volume becomes larger than the volume of the inner space of the housing 10. If the housing 10 has airtight structure, the module unit 30 is expanded and the optical connecting portion may be damaged. Thus, in the present embodiment, the hole 151 is formed in the cover plate 15, so that a part of the thermally expanded resin 40 flows out through the hole 151, which solves the problem of the expansion of the module unit 30.

Figure 12:
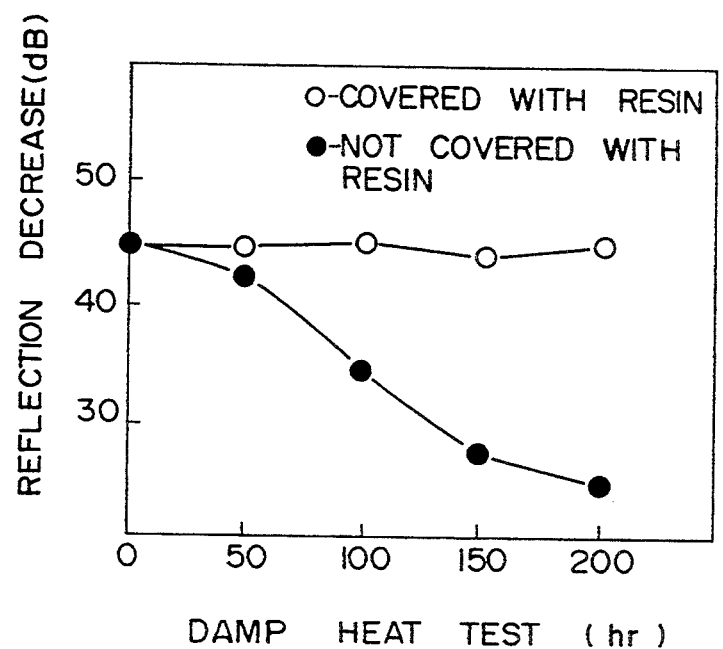
FIG. 12 is a graph showing comparative experiment results of the third embodiment.

The inventors of the present application experimented a damp heat test (60° C., 90% RH, 200 hours) in a case of the module unit 30 provided in the housing 10 being covered with the jelly-like resin 40 and in a case of not covered with the resin 40. The results are shown in FIG. 12. In a graph shown in FIG. 12, a vertical axis shows the amount of a reflection decrease, a horizontal axis shows the amount of a testing time in damp-heating and a white circle shows a the result in a module unit covered with jelly-like resin and a black circle shows the result in a module unit which is not covered with the jelly like resin. It is recognized from the graph that a reflective characteristic of signal light is degraded at the connecting portion due to moisture moistening the adhesive 301.

Figure 13:
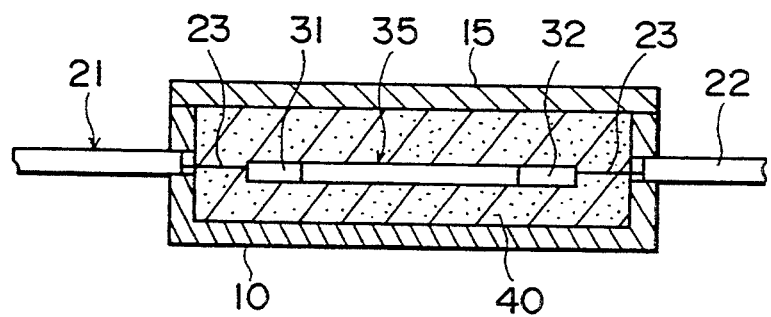
FIG. 13 is a vertical sectional view showing an optical waveguide module according to the fourth embodiment.

In an optical waveguide module of the fourth embodiment shown in FIG. 13, a cover plate 15 does not have a hole, which is different from the third embodiment, and a module unit 30 and a jelly-like resin 40 are housed in a housing 10, and the housing 10 is sealed by the cover plate 15. The remaining structure is the same as the third embodiment. In the fourth embodiment, since the housing 10 is sealed, the optical waveguide module may be used in water.

Figure 14:
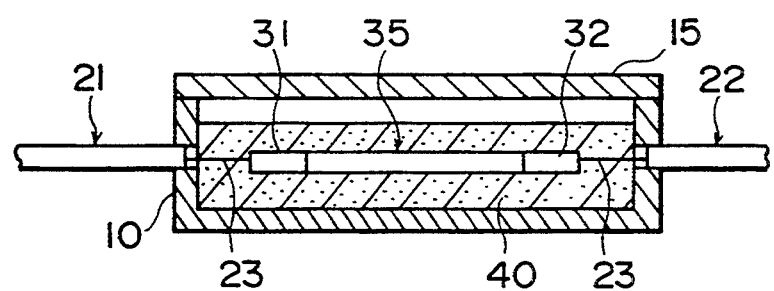
FIG. 14 is a vertical sectional view showing an optical waveguide module according to the fifth embodiment.

In an optical waveguide module of the fifth embodiment shown in FIG. 14, the jelly-like resin 40 to be contained in the housing 10 does not fill up the housing 10, which makes a space therein. An amount of the resin 40 is limited to the amount such that the amount of the expanded resin 40 does not become larger than the volume of the inner space of the housing 10 even though the resin 40 is expanded according to heat depending upon the working temperature. Further, the cover plate 15 does not have a hole, and the housing 14 is sealed with the cover plate 15. Therefore, a coefficient of thermal expansion of the resin 40 is large, and in the case of the resin 40 thermally expanded, the expanded resin 40 only occupies the inner space of the housing 10, and the stress due to the resin 40 is not applied to the module unit 30. Accordingly, the connection loss between the optical waveguide and the end faces of the optical fibers does not increase.

Figure 15:
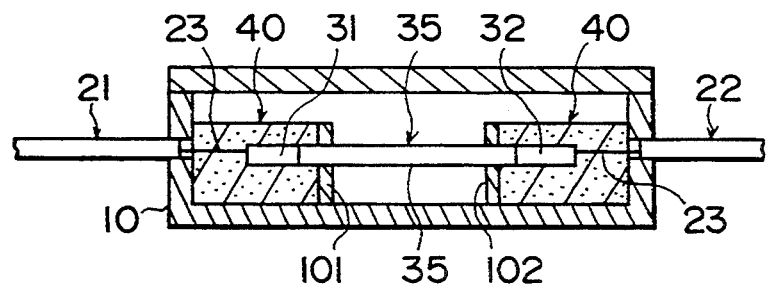
FIG. 15 is a vertical sectional view showing an optical waveguide module according to the sixth embodiment.

In the sixth embodiment shown in FIG. 15, the housing 10 is divided by two diaphragms 101 and 102, and connecting portions between the optical waveguide substrate 35 and the optical fibers 23 are located in two regions formed between the diaphragm 101 and a side wall and between the diaphragm 102 and a side wall. Further, the jelly-like resin 40 is contained only in these region and provided for covering at least the connecting portions. In this embodiment, only a minimum amount of the jelly-like resin 40 required for covering at least the connecting portions is contained in the housing 10, which makes the amount of the resin 40 very little. Further, since the sufficient internal space is formed at the upper part in the housing 10 and especially the upper surface of the waveguide substrate 35 is not covered with the jelly-like resin 40, this embodiment is effective in a case that an optical device such as an isolator or others, an electrode for switching, or others are integrated on the upper surface of the waveguide substrate 35.

Figure 16:
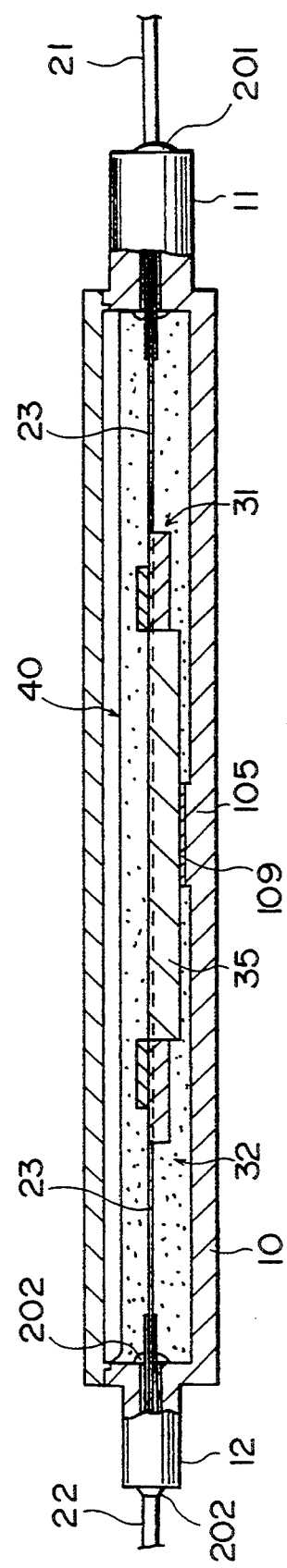
FIG. 16 is a vertical sectional view of an optical waveguide module showing a modified example of an adhesive state of a waveguide substrate and a housing.

In the above-described embodiments, the silica waveguide formed on a silicon substrate is used as the optical waveguide substrate 35 but besides this, the optical waveguide substrate can be made of semiconductor, dielectric substance, glass or others. For the jelly-like resin 40, a silicone rubber, a silicone grease or others can be used besides a silicone gel, and especially a resin which has high water resistance is desirable. The module unit 30 may be fixed at the base of the housing 10 (FIG. 1–FIG. 9), may be floated in the liquid resin 40 (FIG. 10–FIG. 15), or may comprise a protrusion part 105 for supporting the module unit 30 at the base of the housing 10 as shown in FIG. 16. The module unit 30 is fixed with the upper surface of the protrusion part 105, and the large-diameter protective cover 11 is fixed with the ribbon optical fiber cable 21 by the adhesive 201, and the small-diameter protective cover 12 is fixed with the single-optical fiber cable by the adhesive 202.

Figure 17:
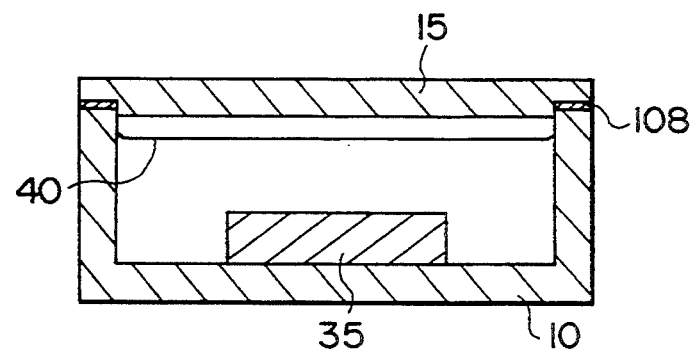
FIG. 17 is a horizontal sectional view of an optical waveguide module showing a modified example of an adhesive state of a housing and a cover unit.
Figure 18:
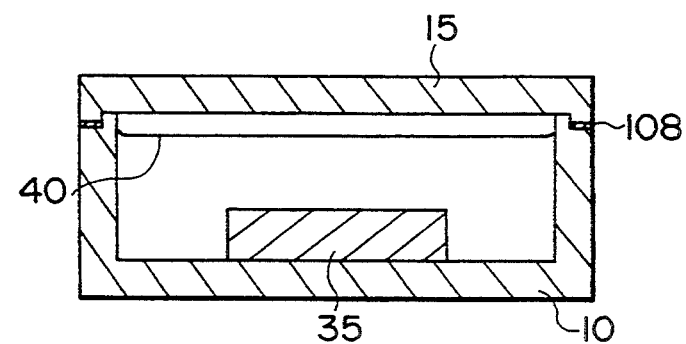
FIG. 18 is a horizontal sectional view of an optical waveguide module showing a modified example of an adhesive state of a housing and a cover unit.
Figure 19:
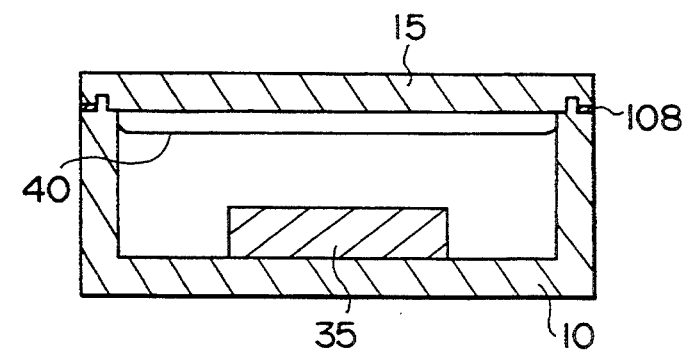
FIG. 19 is a horizontal sectional view of an optical waveguide module showing a modified example of an adhesive state of a housing and a cover unit.

The structure of a joint of the cover unit 15 with the rim of the housing 10 may be constructed as the horizontal sectional views of FIG. 17–FIG. 19. In FIG. 17, cutouts are formed on the cover unit 15 to fit with the rim of the housing 10, and an adhesive 108 lies therebetween. In FIG. 18, the protrusion is formed along the inner rim of the housing 10, and the protrusion is formed along the perimeter of the cover unit 15 corresponding to the outer rim of the housing 10. The adhesive 108 lies between the outer rim of the housing 10 and the protrusion of the cover unit 15. In FIG. 19, the protrusion is formed along the inner rim of the housing 10, and the groove is formed along the perimeter of the cover unit 15 to fit with the protrusion on the rim of the housing 10. The adhesive 108 lies between the outer rim of the housing 10 and the perimeter of the cover unit 15.

Thus, as described above, according to the present invention, a housing the depth of which is larger than the thickness of a module unit, so that the module unit is easily immersed into a liquid resin composition. Therefore, a connecting portion between an optical waveguide and optical fiber cables is covered with an elastic filling material such as, rubber, a jelly-like resin or others, so that the prevention of the moisture from moistening the adhesive of the connecting portion is ensured. Further, the housing is sealed by a cover unit, which improves the weather resistance. Therefore, an optical waveguide module in which, under the high temperature and high humidity, degradation of characteristics, such as increase of loss and light reflection, degrade of tensile strength or others does not occur and which has strength to the oscillation, simple structure, and high reliability can be achieved.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No. 188348/1993 filed on Jul. 29, 1993 and No. 154916/1994 filed on Jul. 6, 1994 are hereby incorporated by reference.

What is claimed is:

1. An optical waveguide module comprising:
   a module unit having a waveguide device with a waveguide substrate on which an optical waveguide is formed, and a fiber connector for holding an optical fiber cable, said waveguide device being bonded to said fiber connector;
   a housing having a space therein sufficiently large to accommodate the entire module unit, said housing having an opening to said space, said module unit being housed entirely within said space of said housing;
   a member made of a resin covering at least a bonding portion between said waveguide device and said fiber connector, said member being introduced in liquid-state into said space of said housing to immerse at least said bonding portion and thereafter being cured in said space of said housing; and
   a cover unit having a substantially flat shape for covering said opening of said housing to seal said housing.

2. An optical waveguide module according to claim 1, wherein said optical fiber cable is a ribbon optical fiber cable having a plurality of bare fibers arranged in a linear array and a coating that bundles said plurality.

3. An optical waveguide module comprising:
   a module unit having a waveguide device with a waveguide substrate on which an optical waveguide is formed, and a fiber connector for holding an optical fiber cable, said waveguide device being bonded to said fiber connector by a photocuring adhesive;
   a housing having a space therein sufficiently large to accommodate the entire module unit, said housing having an opening to said space, said module unit being housed entirely within said space of said housing;
   a member made of a resin covering at least a bonding portion between said waveguide device and said fiber connector, said member being introduced in liquid-state into said space of said housing to immerse at least said bonding portion and thereafter being cured in said space of said housing; and
   a cover unit having a substantially flat shape for covering said opening of said housing to seal said housing.

4. An optical waveguide module comprising:
   a module unit having a waveguide device with a waveguide substrate on which an optical waveguide is formed, and a fiber connector for holding an optical fiber cable, said waveguide device being bonded to said fiber connector;
   a housing having a space therein for housing said module unit, said housing having an opening to said space, said housing having a protective cover protruding to the outside for holding a predetermined length of said optical fiber cable, said entire module unit being housed within said housing;
   a member made of a resin covering at least a bonding portion between said waveguide device and said fiber connector, said member being introduced in liquid-state into said space of said housing to immerse at least said bonding portion and thereafter being cured in said space of said housing; and
   a cover unit having a substantially flat shape for covering said opening of said housing to seal said housing.

5. An optical waveguide module according to claim 4, wherein said housing has a hole through which said optical fiber cable is inserted and led out to outside of said housing; and
   said protective cover comprises a lower member integrally formed with said housing, and an upper member to be adhered to said lower member to form said hole therebetween.

6. An optical waveguide module comprising:
   a module unit having a waveguide device with a waveguide substrate on which an optical waveguide is formed, and a fiber connector for holding an optical fiber cable, said waveguide device being bonded to said fiber connector;
   a housing having a space therein for housing said module unit, said housing having an opening to said space, said housing having an outer rim and an inner rim including a protrusion so that said inner rim is higher than said outer rim, said entire module unit being housed within said housing;
   a member made of a resin covering at least a bonding portion between said waveguide device and said fiber connector, said member being introduced in liquid-state into said space of said housing to immerse at least said bonding portion and thereafter being cured in said space of said housing; and
   a cover unit having a substantially flat shape for covering said opening of said housing to seal said housing.

* * * * *